(12) United States Patent
Hakim

(10) Patent No.: US 9,629,784 B2
(45) Date of Patent: Apr. 25, 2017

(54) PACIFIERS

(76) Inventor: Nouri E. Hakim, Monroe, LA (US)

( * ) Notice: Subject to any disclaimer, the term of this patent is extended or adjusted under 35 U.S.C. 154(b) by 0 days.

(21) Appl. No.: 13/231,302

(22) Filed: Sep. 13, 2011

(65) Prior Publication Data

US 2012/0150227 A1    Jun. 14, 2012

Related U.S. Application Data

(60) Provisional application No. 61/382,457, filed on Sep. 13, 2010.

(51) Int. Cl.
*A61J 17/00* (2006.01)
*B29C 45/14* (2006.01)
*A61J 17/02* (2006.01)

(52) U.S. Cl.
CPC .............. *A61J 17/001* (2015.05); *A61J 17/02* (2013.01); *B29C 45/14* (2013.01)

(58) Field of Classification Search
CPC ........... A61J 17/00; A61J 17/001; A61J 17/02

USPC .......................... 606/234–236; D24/194–196
See application file for complete search history.

(56) References Cited

U.S. PATENT DOCUMENTS

| | | | | |
|---|---|---|---|---|
| 4,143,452 A | * | 3/1979 | Hakim | 29/434 |
| 4,688,571 A | * | 8/1987 | Tesler | 606/234 |
| 5,782,561 A | * | 7/1998 | Pai | 374/151 |
| 6,110,193 A | * | 8/2000 | Chen | 606/234 |

OTHER PUBLICATIONS

"Monolithic." www.merriam-webster.com/dictionary/monolithic. Aug. 14, 2014. p. 1.*

* cited by examiner

*Primary Examiner* — Ashley Fishback
(74) *Attorney, Agent, or Firm* — Robert M. Chiaviello, Jr.

(57) ABSTRACT

Molding method of manufacturing for soft-shield and orthodontic pacifiers, and for pacifiers having snap-in caps that prevent exposing baglet to molten plastic during molding process.

3 Claims, 9 Drawing Sheets

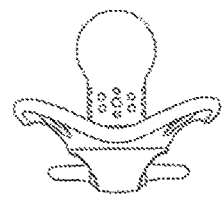
FIG. 1(a)
FIG. 1(b)
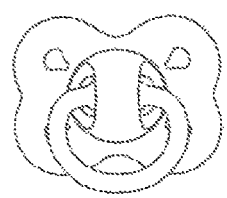
FIG. 1(c)
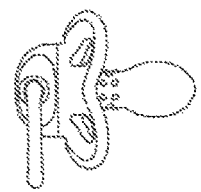
FIG. 1(d)
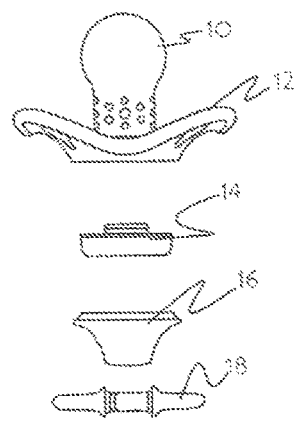
FIG. 1(e)
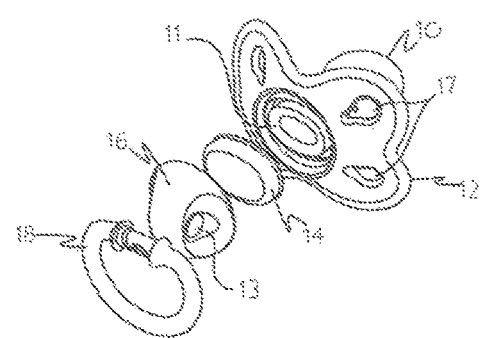
FIG. 1(f)
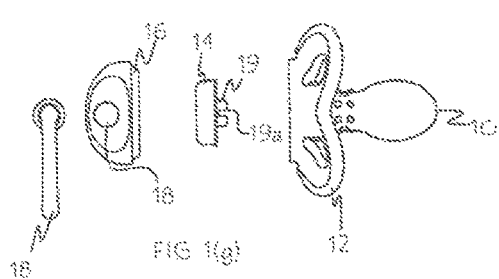
FIG. 1(g)
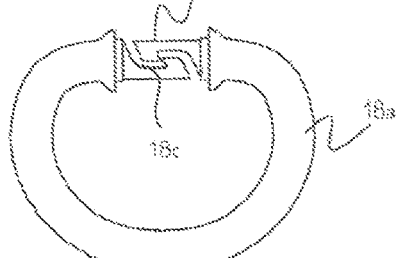
FIG. 1(h)
FIG.1

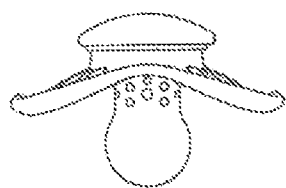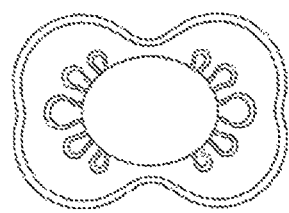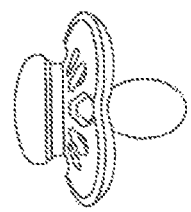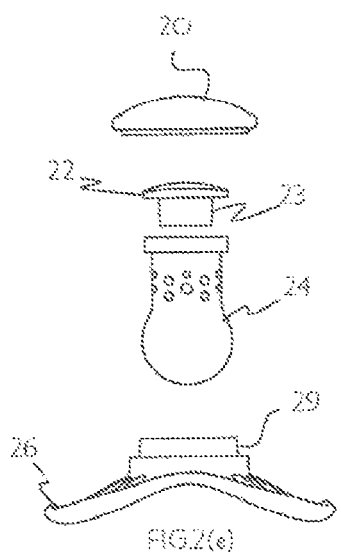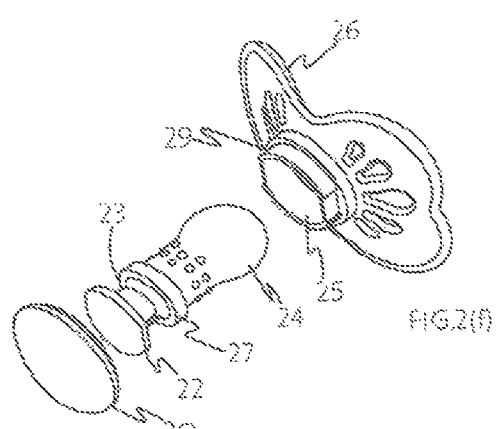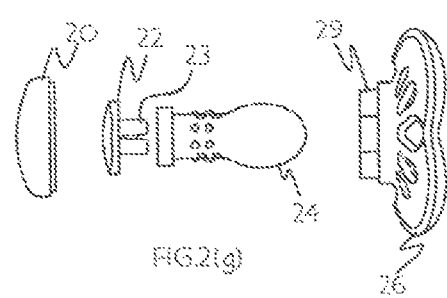
FIG.2

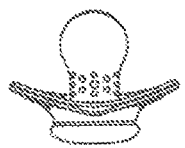
FIG.3(a)
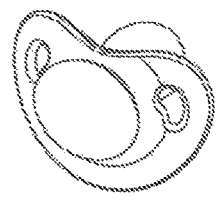
FIG.3(d)
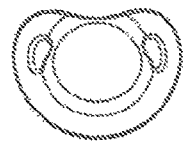
FIG.3(b)
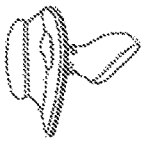
FIG.3(f)
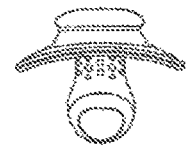
FIG.3(c)
FIG.3(e)
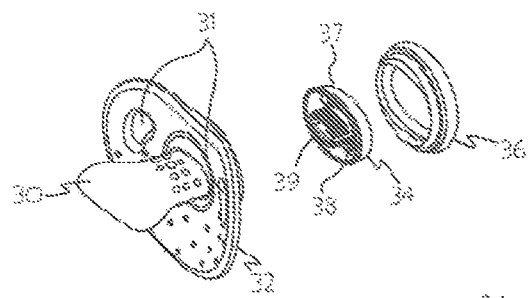
FIG.3(g)
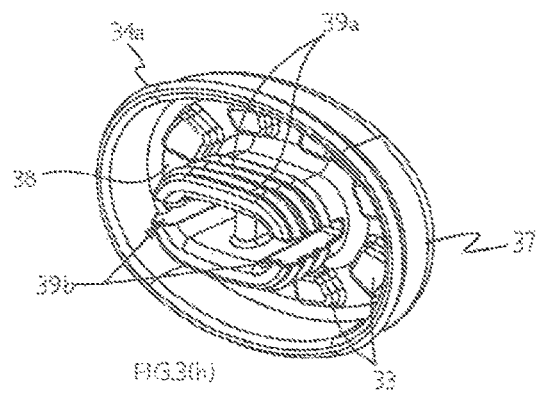
FIG.3(h)
FIG.3

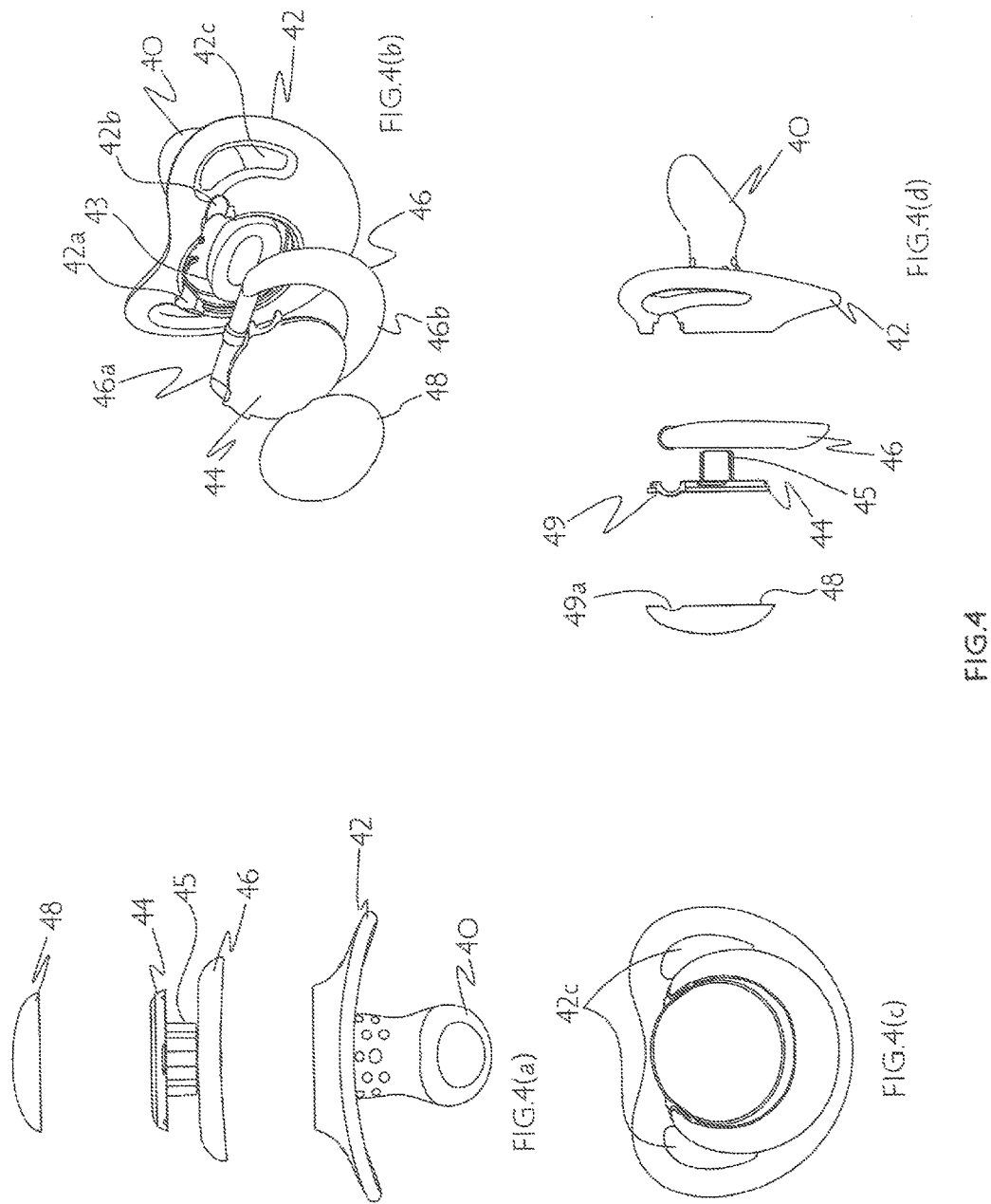

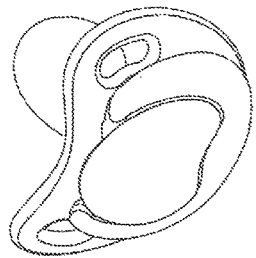
FIG.5(e)
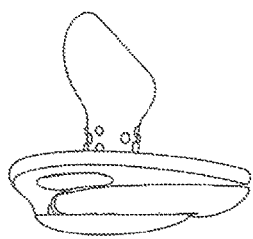
FIG.5(d)
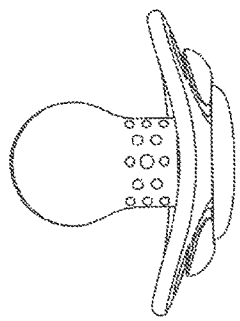
FIG.5(a)
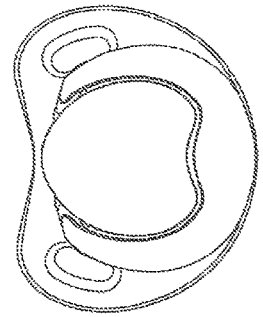
FIG.5(b)
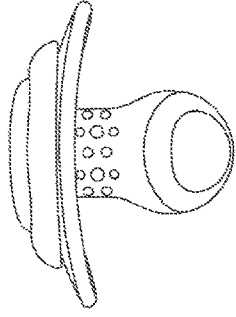
FIG.5(c)
FIG.5

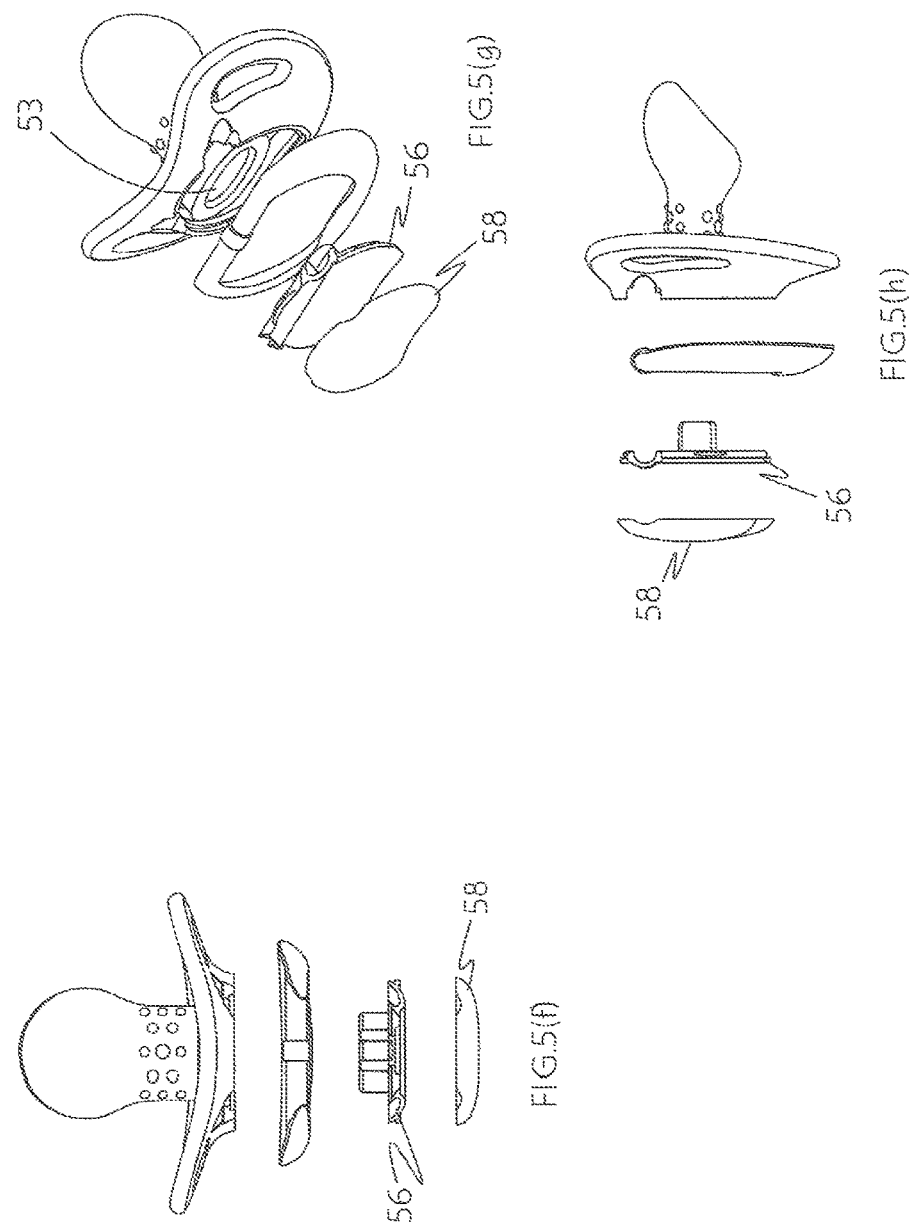

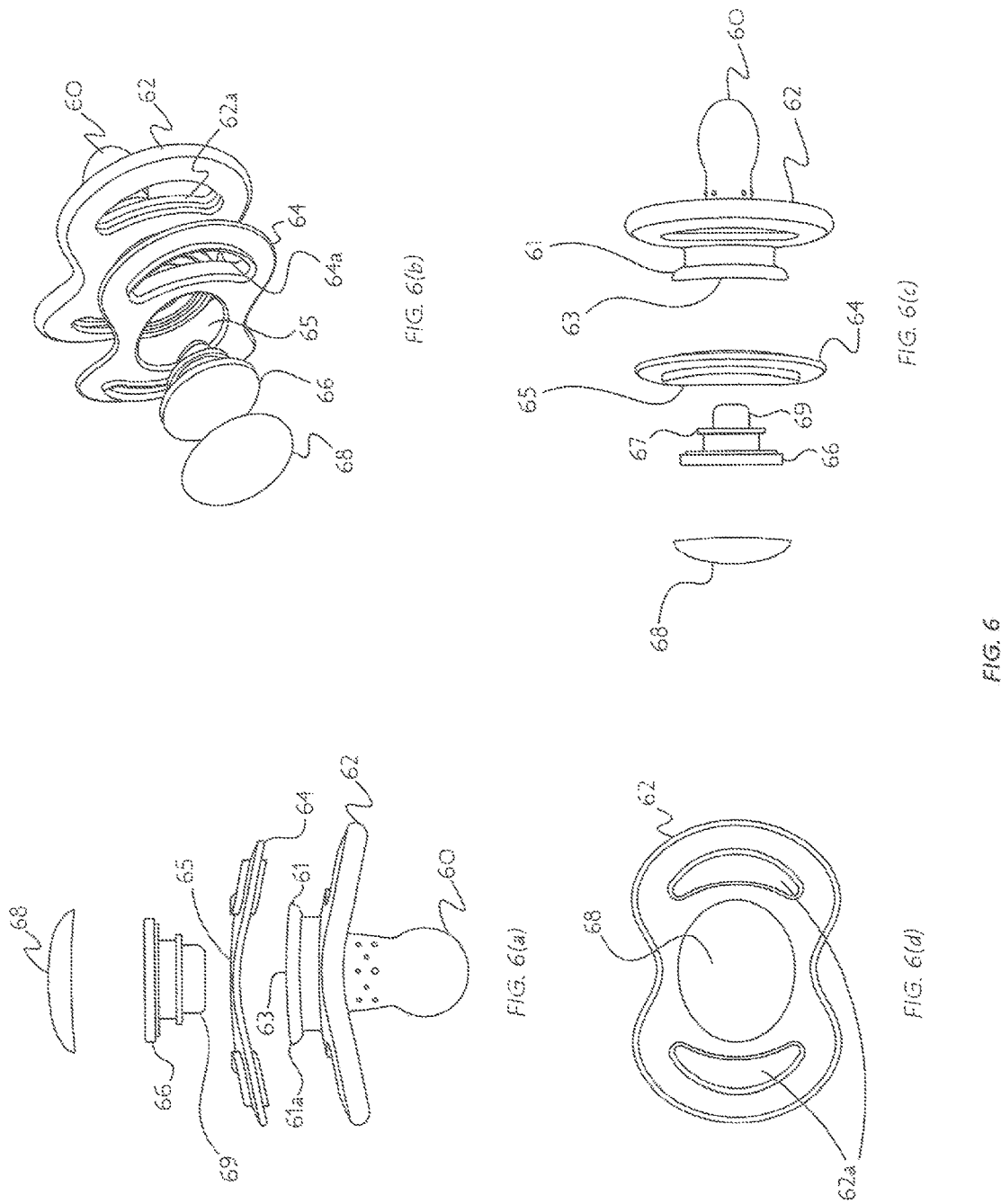

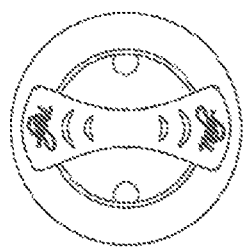
FIG.7(a)
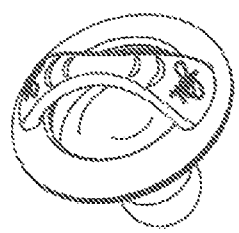
FIG.7(b)
FIG.7(c)
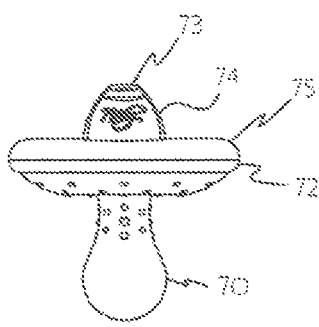
FIG.7(d)
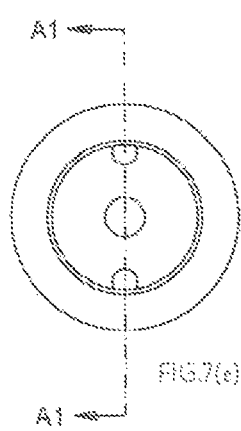
FIG.7(e)
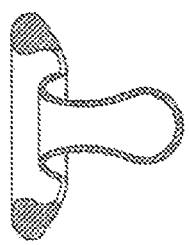
FIG.7(f)
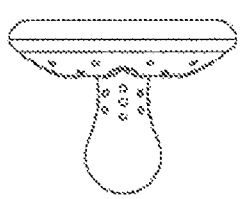
FIG.7(g)
FIG.7

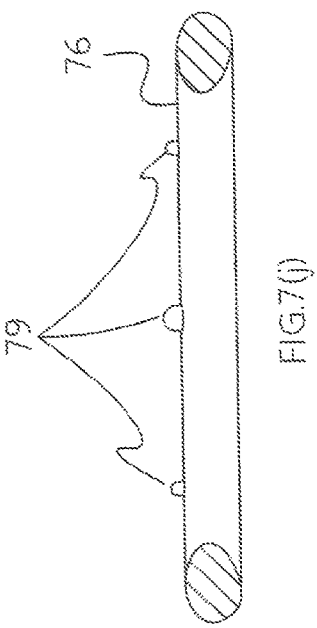
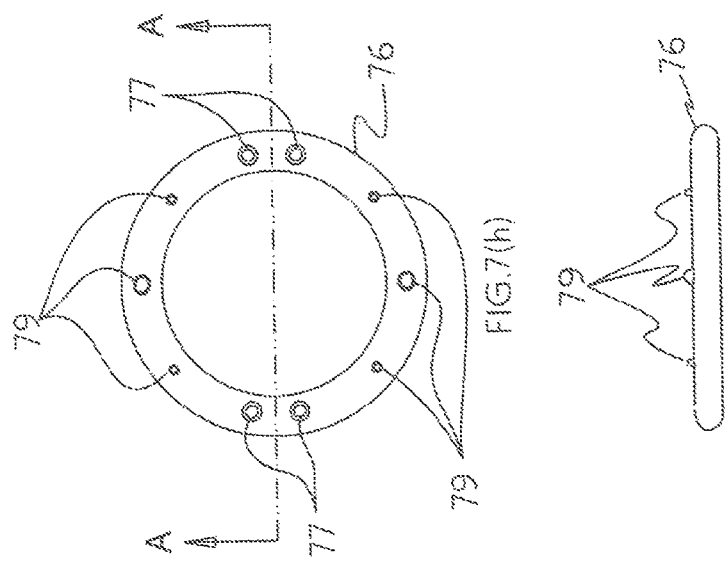
FIG. 7

PACIFIERS

RELATED APPLICATIONS

This application claims the benefit of and all rights of priority to U.S. Provisional Application. Ser. No. 61/382,457 filed Sep. 13, 2010, which is fully incorporated herein by reference.

BACKGROUND OF THE INVENTION

The present invention is directed to improved baby products, specifically pacifiers. The present invention is also directed to methods of manufacturing pacifiers.

Pacifiers generally consist of multiple components, such as a handle, shield and a baglet (or nipple). As is well known in the art, the baglet is the portion of a pacifier that a child sucks on. To reduce the weight and amount of material in the pacifier, and also to provide the desired sucking resistance of the baglet, it is common for the baglet to be hollow, having an opening at the end opposite that of the end which enters the child's mouth. To secure the various components of the pacifier together and to minimize the potential for dirt and bacteria accumulation between the various components of the pacifier, it is common practice to secure one or more components of the pacifier together through a sonic welding process such as high-frequency welding. However, certain plastics which are commonly used to make pacifier components, such as polypropylene, do not adhere well to each other through the high-frequency welding process. This is especially true when trying to weld together two pieces of the same type of plastic, such as polypropylene to polypropylene. In fact, it is common for the welding process to leave portions of the components unattached. This results in an inferior product with shorter lifespan and also poses a safety hazard in that the pacifier can come apart while the child is sucking, increasing the risk of choking. In addition, a sonic welding process can burn or otherwise degrade certain materials such as latex. A baglet that is burned or otherwise degraded from this process poses additional health and safety risks for children and infants.

Over molding, or insert molding (terms which will be used interchangeably throughout this application), as well as similar molding processes commonly used for thermoset plastics and thermoplastic elastomers and the like, in which a component of the final product is injected in liquid form into a mold that contains the other, fully formed component or components which are to be adhered to, creates a vastly superior adhesion, resulting in a single-piece, permanently fixed final product with little to no risk of components coming apart or separating from one another. The use of insert molding to form a conventional pacifier, however, can result in molten plastic entering the baglet and/or spreading on and around the outer surface of the baglet during the molding process. This can damage the baglet, distort its shape, alter the sucking resistance of the baglet or portions of the baglet, or render the baglet otherwise unusable, unsafe or undesirable.

There is also a need for pacifiers with soft shields while maintaining sufficient rigidity, as well as pacifiers having single-component shield and baglet combinations that can be effectively and commercially manufactured. Soft shields made from, for example, silicone, reduce the chance of injury to a child who falls with the pacifier in his/her mouth, and increase the comfort of using the pacifier. Soft shields also provide greater surface area for teething and the implementation of teething structures (such as nubs, protrusions, and so forth). However, it is important that soft-shield pacifiers have sufficient structural integrity or rigidity to prevent contortion of the pacifier during use that could result in the child swallowing or otherwise placing the pacifier into the esophagus and choking. Single-component shield and baglet combinations are desirable as they are easier to clean than the conventional dual component shield and baglet. In a dual component shield and baglet, the area between the baglet and shield opening cannot be easily cleaned, and can become wet with saliva, mucus, water, and so forth, resulting in the growth of bacteria or mold. A single-component shield and baglet combination eliminates these deficiencies. In addition, a single-component, soft shield and baglet combination allows for the creation of an "oscillating pacifier," a highly desirable form of pacifier which more closely imitates the motion of sucking on a natural breast.

Accordingly, there is a need to improve pacifiers and the method of manufacturing pacifiers.

SUMMARY OF THE INVENTION

In accordance with one embodiment of the present invention, a mini-butterfly or bowtie pacifier is provided having a snap-in cap that prevents any molten plastic or other material from entering the baglet during the insert molding process. A method for manufacturing this embodiment of the invention is also disclosed herein.

In accordance with a further embodiment of the present invention, a mini-orthodontic pacifier is provided having a snap-in cap that prevents any molten plastic or other material from entering the baglet during the insert molding process. A method for manufacturing this embodiment of the invention is also disclosed herein.

In accordance with a further embodiment of the present invention, a classic orthodontic pacifier with swivel handle is provided having a snap-in cap that prevents any molten plastic or other material from entering the baglet during the insert molding process. A method for manufacturing this embodiment of the invention is also disclosed herein.

In accordance with a further embodiment of the present invention, a tear-drop style pacifier with swivel handle is provided having a snap-in cap that prevents any molten plastic or other material from entering the baglet during the insert molding process. A method for manufacturing this embodiment of the invention is also disclosed herein.

In accordance with a further embodiment of the present invention, a silicone knob, soft-shield pacifier is provided having a snap-in cap that prevents any molten plastic or other material from entering the baglet during the insert molding process. This embodiment also provides a soft shield with sufficient rigidity, as well as a single-component baglet and shield combination. A method for manufacturing this embodiment of the invention is also disclosed herein.

In accordance with a further embodiment of the present invention, a round oscillating silicone pacifier having an internal ring for providing structural integrity is provided. This embodiment also provides a soft shield with sufficient rigidity, as well as a single-component baglet and shield combination. A method for manufacturing this embodiment of the invention involving multiple molding operations is also disclosed herein.

Further embodiments of the invention will be apparent in conjunction with the drawings and the detailed disclosure herein.

BRIEF DESCRIPTION OF THE FIGURES

FIG. 1 depicts a mini-butterfly pacifier embodiment of the present invention.

FIG. 1(*a*) is a front view of mini-butterfly pacifier embodiment of the present invention.

FIG. 1(*b*) is perspective bottom view thereof.

FIG. 1(*c*) is a bottom view thereof.

FIG. 1(*d*) is a side view thereof, the opposite side being a mirror image thereof.

FIG. 1(*e*) is an exploded view of the depiction in FIG. 1(*a*).

FIG. 1(*f*) is an exploded view of the depiction in FIG. 1(*b*).

FIG. 1(*g*) is an exploded view of the depiction in FIG. 1(*d*).

FIG. 1(*h*) is a more detailed view of one component—the handle—of this embodiment.

FIG. 2 depicts a conventional butterfly pacifier common in the art:

FIG. 2(*a*) is a front view of a conventional butterfly pacifier common in the art.

FIG. 2(*b*) is a perspective view thereof.

FIG. 2(*c*) is a top view thereof.

FIG. 2(*d*) is a side view thereof, the opposite side being a mirror image thereof.

FIG. 2(*e*) is an exploded view of the depiction in FIG. 2(*a*).

FIG. 2(*f*) is an exploded view of the depiction in FIG. 2(*b*).

FIG. 2(*g*) is an exploded view of the depiction in FIG. 2(*d*).

FIG. 3 depicts a mini-orthodontic pacifier embodiment of the present invention.

FIG. 3(*a*) is a front view of a mini-orthodontic pacifier embodiment of the present invention.

FIG. 3(*b*) is a bottom view thereof.

FIG. 3(*c*) is a rear view thereof

FIG. 3(*d*) is a perspective bottom view thereof.

FIG. 3(*e*) is a perspective side view thereof.

FIG. 3(*f*) is a side view thereof, the opposite side being a mirror image thereof.

FIG. 3(*g*) is an exploded view of the depiction in FIG. 3(*e*).

FIG. 3(*h*) is a more detailed view of the snap-in cap shown in FIG. 3(*g*).

FIG. 4 depicts a classic orthodontic pacifier embodiment of the present invention.

FIG. 4(*a*) is an exploded front view of a classic orthodontic pacifier embodiment of the present invention.

FIG. 4(*b*) is an exploded perspective top view thereof.

FIG. 4(*c*) is a top view thereof.

FIG. 4(*d*) is an exploded side view thereof.

FIG. 5 depicts a tear drop-style pacifier embodiment of the present invention.

FIG. 5(*a*) is a front view of a tear drop-style pacifier embodiment of the present invention.

FIG. 5(*b*) is a bottom view thereof.

FIG. 5(*c*) is a rear view thereof.

FIG. 5(*d*) is a side view thereof, the opposite side being a mirror image thereof.

FIG. 5(*e*) is a bottom perspective view thereof.

FIG. 5(*f*) is an exploded view of the depiction in FIG. 5(*a*).

FIG. 5(*g*) is an exploded view of the depiction in FIG. 5(*e*).

FIG. 5(*h*) is an exploded view of the depiction in FIG. 5(*d*).

FIG. 6 depicts a silicone knob pacifier embodiment of the present invention having a soft shield.

FIG. 6(*a*) is a front exploded view of a silicone knob pacifier embodiment of the present invention having a soft shield.

FIG. 6(*b*) is a side exploded perspective view thereof.

FIG. 6(*c*) is a side exploded view thereof.

FIG. 6(*d*) is a top view thereof.

FIG. 7 depicts a round oscillating silicone pacifier embodiment of the present invention.

FIG. 7(*a*) is a bottom view of a round oscillating silicone pacifier embodiment of the present invention.

FIG. 7(*b*) is a bottom perspective view thereof.

FIG. 7(*c*) is a front view thereof.

FIG. 7(*d*) is a rotated front view thereof.

FIG. 7(*e*) is a top view thereof with handle component removed.

FIG. 7(*f*) is a side cross-sectional view thereof along line A-A denoted in FIG. 7(*e*).

FIG. 7(*g*) is a front view of the embodiment depicted in FIGS. 7(*e*) and 7(*f*).

FIG. 7(*h*) is a top view of one component—the inner ring—of the embodiment of FIG. 7.

FIG. 7(*i*) is a front view of component depicted in FIG. 7(*h*).

FIG. 7(*j*) is a cross-sectional front view of the component depicted in FIG. 7(*h*) along line A-A denoted in FIG. 7(*h*).

DETAILED DESCRIPTION OF THE INVENTION AND THE PREFERRED EMBODIMENTS

The present invention is directed to improved infant and child pacifiers and improved methods of manufacturing such pacifiers.

A conventional butterfly pacifier, commonly known in the art, is depicted in FIG. 2. Referring to FIGS. 2(*e*), 2(*f*), and 2(*g*) the various components of a conventional butterfly pacifier are shown. In particular, the butterfly pacifier comprises insert molded cap 20, baglet plug 22, baglet 24 and shield 26 having opening 25 and shield flange 29. Baglet 24 has outwardly extending flange 27. Baglet plug 22 has one or more plug extensions 23. Extensions 23 are configured to hug the inner flexible wall of baglet 24 when extensions 23 are inserted into the opening of baglet 24. Baglet 24 is inserted into opening 25 of shield 26. Baglet plug extensions 23 are inserted into the opening of baglet 24 and the two parts are inserted into opening 25 of shield 26 allowing baglet plug 22 to engage with the top edge of shield flange 29. Thus, plug 22 helps to prevent pulling the soft and flexible baglet through the opening 25 of shield 26 when the pacifier is fully assembled.

With reference to FIGS. 2(*e*), 2(*f*), and 2(*g*), the embodiment of FIG. 2 is manufactured as follows. Baglet 24, made from a pliable and flexible material is provided. Shield 26, baglet plug 22 and insert molding cap 20 are made from various rigid and/or flexible plastic materials, are also provided. Baglet plug extensions 23 are inserted into the opening of baglet 24. The plugged baglet 24 is inserted into opening 25 of shield 26. Typically, the cap 20 is then welded with high frequency sonic welding or the like onto the face of baglet plug 22 and shield 29. As described above, the sonic welding process frequently creates gaps between the cap and the baglet plug which do not adhere. Moreover, were insert molding to be employed instead, plug 22 would be unable to prevent molten plastic from entering the baglet and/or spreading on the surface of the baglet by seeping through the space between the opening in the shield and the surface of the baglet.

As an improvement over conventional pacifiers and methods of manufacturing thereof, in a first embodiment of the present invention, an improved mini-butterfly or bowtie pacifier is provided. The terms "mini-butterfly" and "bowtie" refer to the appearance of the general shape of the shield of the pacifier, one side of which, as is commonly known in the art, rests on the face of the infant or child. As described above with reference to a conventional pacifier commonly known in the art, the typical components of a mini-butterfly or bowtie pacifier include a soft, flexible, hollow baglet having an opening on one end, a rigid shield, a plug that prevents the baglet from escaping through the opening in the shield, a cap that secures the baglet and the shield together, and a handle.

In this embodiment of the present invention, instead of a conventional plug, a snap-in cap is provided that covers and seals the opening of the baglet and also covers the outer rim surrounding the opening of the baglet by snapping into place around the rim of the opening in the shield. The snap-in cap also plugs the baglet opening, such that when the snap-in cap is snapped in place, the baglet cannot be pulled through the opening in the shield. The snap-in cap further functions to prevent molten plastic, which is introduced during the manufacturing stage when the cap is insert molded onto the other components, from entering the baglet through the baglet's opening. To seal the components together to form the complete pacifier, the pacifier cap is insert molded onto the snap-in cap. The particular features of the snap-in cap will be described below with reference to FIG. 3.

Referring to FIGS. 1(e), 1(f), and 1(g) the various components of this embodiment are shown. In particular, the embodiment comprises a baglet 10, shown inserted through an opening 11 of shield 12, snap-in cap 14 which snappingly fits around opening 11 of shield 12, pacifier cap 16 which is insert molded onto snap-in cap 14, and handle 18 which is looped through opening 13 of pacifier cap 14. Air vents 17 in shield 12 allow air to pass to the skin of the infant while the infant is sucking, prevent suctioning of the shield to the infant's face, and further prevent choking if the pacifier is swallowed. FIG. 1(h) shows a more detailed view of handle 18 depicting engaging ends (or complementary fitting hooks) 18b and 18c of loop 18a where the hooks engage each other as shown once the handle is looped through opening 13.

The embodiment of FIG. 1 is manufactured as follows. Baglet 10, made from a pliable and flexible material, such as silicone or other suitably strong and flexible material known in the art, is provided. In accordance with one preferred method of the present invention, Liquid Injection Manufacturing Silicone (LIMS) is utilized to create the baglet. After the baglet is formed, a post-curing process may be appropriate or required, depending on the material, as is known in the art. Thermoset material, for example, needs to be post cured, while post curing is not necessary for thermoplastics. As is well known, curing can increase the strength of the material and remove volatile materials to comport with applicable regulations that limit such materials.

Shield 12, snap-in cap 14, pacifier cap 16 and handle 18, which are made from various rigid and/or flexible plastic materials, such as polypropylene and the like, are also provided. These can be molded separately using methods commonly known in the art. Baglet 10 is inserted through opening 11 of shield 12. Baglet 10 has a cavity terminating to an opening at its bottom. Baglet 10 has an outwardly extending flange surrounding the opening at its bottom that helps to prevent baglet 10 from escaping through opening 11 of shield 12 in the same direction in which said baglet is inserted through said opening during the manufacturing process.

Snap-in cap 14 is fitted in snapping fashion over the edge of the shield opening 11, at the same time plugging the opening in baglet 10, which holds baglet 10 in place. Said plugging is accomplished by one or more protrusions 19 extending in the cavity of baglet 10, said one or more protrusions hugging the inner wall of baglet 10, preventing baglet 10 from escaping through opening 11 of shield 12. In a preferred embodiment, one or more protrusions 19 have one or more ribs extending outwardly which contact the inner surface of the baglet, providing a gripping interference fit therewith. The one or more ribs are angled toward the inside if the top of snap-in cap 14, rendering the extraction of baglet 10 from the pacifier by pulling baglet 10 extremely difficult and virtually impossible. In another preferred embodiment, snap-in cap 14 has one or more vent-slots 19a between protrusions 19. These vent slots permit air to pass through the face of the shield from the baglet, such as when a child compresses the baglet with his/her teeth.

In addition to keeping baglet 10 in place, snap-in cap 14, when snapped-in position as just described, functions to keep any molten plastic resulting from an insert molding process (described below) from flowing into the cavity of baglet 10 or otherwise contacting the baglet.

Baglet 10, shield 12 and snap-in cap 14 are assembled as described above. The assembly of baglet 10, shield 12 and snap-in cap 14 are then inserted into a mold. The mold closes onto this assembly and pacifier cap 16 is injected, through the use of insert molding, on top of snap-in cap 14. The insert molding process seals all of the assembled parts, namely the baglet 10, the shield 12, the snap-in cap 14 and the pacifier cap 16 together into a single unit. Any molten plastic resulting from the insert molding process is kept from flowing into the cavity of baglet 10 because the bottom opening in baglet 10 and shield opening 11 are covered and snappingly sealed by snap-in cap 14 during and after the insert molding process. In another embodiment, handle 18 can be looped through opening 13 by hand in the pacifier cap after the insert molding operation.

A mini-orthodontic pacifier embodiment of the present invention is shown in FIG. 3. The shape of the shield and baglet in orthodontic pacifiers more closely conforms with the anatomy of an infant's mouth and pallet. Aside from the overall shape, the essential components of this embodiment do not materially differ from those of the mini-butterfly or bowtie pacifier as described above. As, with the mini-butterfly or bowtie pacifier embodiment of the present invention, this embodiment utilizes a snap-in cap. The snap-in cap 34 has one or more extensions or protrusions that hug the inner wall of the baglet. As is shown more clearly in FIGS. 3(g) and 3(h), on the inside of the snap-in cap there is a substantially race-track shaped surface 38 bounded by the base of the protrusions 39 on the inside, and the inner side of the wall 37 of the snap-in cap on the outside. This surface 38 has one or more protruding stops 33, which press up against the rim of the opening of baglet 30 when baglet 30 and snap-in cap 34 are assembled. Protruding stops 33 prevent baglet 10 from backing up inside of the pacifier assembly and further allow air to pass around the baglet rim and inside the snap-in cap via the channels between said protruding stops. In a preferred embodiment, eight such protruding stops are provided. Air can enter and leave the baglet through one or more vent slots 39b, passing into and out of the snap-in cap 34 via protruding stops 33. Protrusions 39 have ribs 39a which contact the inner surface of the baglet, providing a gripping interference fit therewith. In a preferred embodiment, the one or more ribs 39a are angled toward the inside of the top of snap-in cap 34, rendering the extraction of baglet 30 from the pacifier by pulling the baglet extremely difficult and virtually impossible.

The snap-in cap 34 has a rim 34a that snappingly engages around the opening in shield 32 through which baglet 30 is inserted. Thus, the snap-in cap, when engaged inside and around the baglet opening, and around the shield opening, prevents the baglet from escaping through the opening in the shield and further prevents molten plastic from contacting any portion of the baglet during the molding process.

With further reference to FIGS. 3(g) and 3(h), the mini-orthodontic pacifier is manufactured as follows. Baglet 30, made from a pliable and flexible material such as silicone and the like is provided. Shield 32 having air vents 31, snap-in cap 34 and pacifier cap 36 are made from various rigid and/or flexible plastic materials such as polypropylene and the like. Baglet 30 is inserted through an opening of shield 32 as described above with reference to the other embodiments, and then snap-in cap 34 is fitted over the openings of the shield 32 and baglet 30, such that the inner side of the wall 37 of the snap-in cap engages the outer edge of the shield flange. Pacifier cap 36 is then molded onto snap-in cap 34 and shield 32 resulting in a one piece pacifier. The insert molding process is as described above. Molding seals all of the assembled parts, namely, the baglet 30, the snap-in cap 34, shield 32 and cap 36 together into a single unit. Snap in cap 34 prevents any molten plastic resulting from the molding process from entering baglet 30 or otherwise contacting baglet 30.

A further orthodontic pacifier embodiment of the present invention, having a swivel, or rotating, handle, is shown in FIG. 4. It should be noted that a swivel handle or other type of handle can be added to previous embodiments of this invention in a manner as described below, or alternatively in a manner already commonly known in the art.

Referring to FIGS. 4(a), 4(b), and 4(d) the various components of this embodiment of an orthodontic pacifier are shown. In particular, the orthodontic pacifier comprises baglet 40, shown inserted through an opening of 43 of shield 42. Handle 46 comprising loop 46b and axle 46a is assembled onto shield 42 by positioning the axle 46a of the handle to fit into depressions 42a and 42b of shield 42. Shield 42 has air vents 42c. The snap-in cap 44 has a groove 49 that can be snappingly placed over axle 46a, allowing axle 46a to rotate. The snap-in cap 44 snap-fits around the opening in the shield, and also around the handle and baglet assembly to hold into place the handle 46 and baglet 40. Pacifier cap 48 is then insert molded onto the assembly of snap-in cap 44, handle 46, shield 42 and baglet 40.

The pacifier of FIG. 4 is assembled as follows. Baglet 40, made from a pliable and flexible material such as silicone and the like, is provided. Shield 42 having opening 43, snap-in cap 44 with one or more extensions or protrusions 45 and groove 49, pacifier cap 48 and handle 46 are made from various rigid and/or flexible plastic materials such as polypropylene and the like. Baglet 40 is inserted through opening 43; around the bottom opening of baglet 40 (not shown) there is an outwardly extending flange that helps prevent baglet 40 from escaping the shield 42 during the manufacturing process. Baglet 40 has an opening through which the baglet cavity is accessible. Handle 46 is then positioned onto the rear of shield 42 and more particularly axle 46a of handle 46 is positioned to fit into depressions 42a and 42b of shield 42. Snap-in cap 44 is fitted in snapping fashion around shield opening 43 and axle 46a, such that one or more extensions or protrusions 45 enter the cavity of baglet 40, thus holding baglet 40 and axle 46a in place (while still allowing rotational movement of axle 46a). Snapping in snap-in cap 44 further protects the inner and outer surfaces of baglet 40 from coming in contact with molten plastic during the insert molding process which will now be described as part of the manufacturing process of the pacifier in FIG. 4.

Baglet 40, shield 42, handle 46 and snap-in cap 44 are assembled as described above. The assembly of baglet 40, shield 42, handle 46 and snap-in cap 44 are inserted into a mold. The mold closes onto the assembly and injects pacifier cap 48 (through the use of insert molding) onto the top of snap-in cap 44. Pacifier cap 48 has depression 49a that becomes molded over the outside of groove 49 of snap-in cap 44. The insert molding process seals all of the assembled parts together. Any molten plastic resulting from the insert molding process is kept from flowing into the cavity of baglet 40 or otherwise coming in contact with baglet 40 because the bottom opening of baglet 40 and shield opening 43 are covered and sealed by snap-in cap 44.

FIG. 5 shows an alternative embodiment to the pacifier in FIG. 4, wherein pacifier cap 58, snap-in cap 56, and shield opening 53 have an indented-egg shape, or tear-drop shape, rather than the substantially oval shape of the same components 48, 44, and 43, respectively, of the embodiment in FIG. 4.

FIG. 6 shows a further embodiment of the present invention in which the baglet and shield form a single component, molded from a soft, flexible material such as silicone and the like. The rear side of the shield portion of the baglet-shield component is bordered by a protruding perimeter while having a recessed interior. A second, inner shield made from nylon or other material of similar hardness is nested in said recess. Said inner shield provides the pacifier with the necessary structural integrity to prevent choking and comply with government regulations concerning pacifier safety.

Referring to FIGS. 6(a), 6(b), and 6(c) the various components of this embodiment are shown. In particular, the pacifier comprises pacifier cap 68, plug 66, inner shield 64 with opening 65 and air vents 64a, and baglet-shield component 62 with shield extension 61, shield opening 63, baglet portion 60, and air vents 62a. The inner wall of shield extension 61 has a groove (not shown) substantially the same size and shape as shield opening 63 and also parallel thereto. Shield extension 61 also has a protruding lip 61a surrounding shield opening 63. Plug 66 has extension 69 that fits inside rear portion of baglet portion 60 of baglet-shield component 62. Plug 66 also has ridge 67 extending laterally beyond extension 69.

Baglet-shield component 62, made from soft and flexible material such as silicone, is provided. Inner shield 64 is nested inside the recess at the rear of the shield portion of baglet-shield component 62. Plug 66, made from high durometer silicone or the like, is inserted through inner shield opening 65 and shield opening 63 such that plug extension 69 enters rear portion of baglet portion 60 of baglet-shield component 62. When plug 66 is inserted as just described, ridge 67 snaps into the groove (not shown) located inside shield extension 61, forming an air-tight or near air-tight seal. The underside of the top of plug 66 rests on the inner shield 64. Thus, plug 66 keeps the inner shield in place inside the rear portion of the baglet-shield component 62, and further prevents any molten plastic from coming in contact with any portion of the baglet-shield component 62 during the insert molding process involving cap 68. Cap 68, made from reasonably hard molding material such as polypropylene and the like, is molded onto both the top side of the top of plug 66 and a ring shaped portion of the inner shield 64. The operation of insert molding (described above) the cap 68 onto the top of plug 66 and inner shield 64 seals the assembled components together into a one-piece soft-shield pacifier.

FIG. 7 shows a further embodiment of the present invention. FIG. 7 shows an oscillating pacifier, in which the external surface of the entire pacifier is made of a soft, flexible material, such as silicone. To provide the necessary rigidity, an inner ring made of a harder material, preferably high-heat polypropylene, is embedded, via a multi-step molding process, inside the shield of the oscillating pacifier.

Referring now to the drawings in FIG. 7, inner ring 76 is made from a relatively hard plastic material such as high-heat polypropylene that can withstand the high temperatures associated with silicone molding. During the first molding operation of the baglet, shield, and over-molded ring component, one or more pins within the mold suspend inner ring 76 in order for the shield and over-molded ring, when formed, to fully encapsulate ring 76. Said one or more pins operate by entering holes 77 in inner ring 76. In addition, inner ring 76 has one or more nubs 79. In a preferred embodiment, there are six such nubs, in two sets of three, as shown in FIG. 7(h). The middle nub in each set of three is larger than the other two nubs, as shown in FIG. 7(j). Nubs 79 function to prevent inner ring 76 from contacting the cavity wall surface of the mold during the first molding operation, described below. This prevents the formation of an uneven layer of silicone during the molding process. In addition, silicone forms over nubs 79 during the first molding operation, resulting in teething bumps or protrusions on which the infant or child can bite or rub his/her gums to promote teeth growth, reduce the pain of teething, and so forth.

The baglet, shield, and over-molded ring component has a baglet portion 70, shield portion 72, and over-molded ring portion 75, each made of relatively flexible and strong material such as silicone and the like. The oscillating pacifier also has handle 74, likewise made from a relatively flexible and strong material such as silicone. In a preferred embodiment, handle 74 has grips 73 comprising grooves and/or ridges.

In a first insert molding operation to manufacture the oscillating pacifier of FIG. 7, inner ring 76 as described above and having one or more holes 77, is provided. In a preferred embodiment, inner ring 76 is inserted, either manually or automatically, into the mold's lower cavity, where it is aligned by the mold core's one or more pins which suspend inner ring 76 by entering one or more holes 77. Upper left, upper right, and lower cavities slide together around the core, and liquid silicone or the like is injected into the mold forming baglet, shield and over-molded ring component of the pacifier, wherein the shield portion 72 and over-molded ring portion 75 fully encapsulate inner ring 76.

In a second molding operation, handle 74 is over-molded onto over-molded ring portion 75. In a preferred embodiment, handle 74 is formed by inserting the product of the first molding operation baglet-side down in a lower cavity. A left slide and right slide come together over the over-molded ring at the same time that an upper cavity is lowered onto the left and right slides. The slides and upper cavity are orientated relative to the lower cavity such that the ends of the handle, when formed, cover the holes 77 in inner ring 76. The handle is then injected into the space within the mold formed by the two slides and the upper cavity. In another preferred embodiment the handle is molded with grooves or ridges that form grips 73.

Having described this invention with regard to specific embodiments, it is to be understood that the description is not meant as a limitation since further embodiments, modifications and variations may be apparent or may suggest themselves to those skilled in the art. It is intended that the present application cover all such embodiments, modifications, and variations.

What is claimed is:

1. A pacifier comprising:
   a plug, a flexible component, and an inner shield;
   a flexible component comprising a single structure having a baglet portion, and a shield portion, the shield portion having opposing front and rear sides, the rear side having a protruding member outwardly extending away from the rear side of the shield portion, the protruding member having an opening opposite the rear side of the shield portion, the opening extending into an internal cavity in the flexible component, the internal cavity having a groove along an inner surface of the protruding member, the baglet portion having a head and neck, the neck of the baglet portion extending away from the front side of the shield portion to the head;
   a plug having a head portion with a topside and an underside and an extension axially extending from the underside of the head portion, the extension having a proximal end adjacent the head portion and a distal end opposite the head portion, the extension having a ridge between the proximal and distal ends, the ridge extending outwardly from the extension, the extension being sized to extend through the opening in the protruding member of the shield portion to fit inside the internal cavity of the flexible component, when the extension of the plug is inserted into the protruding member of the shield portion, the ridge engages the groove securing the plug to the flexible component; and
   an inner shield having opposing front and rear sides and an interior opening between the front and rear sides, the opening in the inner shield being sized so that the protruding member of the shield portion can extend through the opening to slide the inner shield onto the flexible component, when the pacifier is in an assembled state, the inner shield is positioned between a rear surface of the shield portion and the plug with the underside of the head of the plug resting against the rear side of the inner shield and the rear surface of the shield portion resting against the front side of the inner shield.

2. The pacifier as in claim 1, wherein the inner shield is nested inside a recess in the rear surface of the shield portion.

3. The pacifier as in claim 1 further comprising a cap, wherein the cap is affixed to the head of the plug.

* * * * *